United States Patent
Zivkovic et al.

(10) Patent No.: US 11,465,450 B2
(45) Date of Patent: Oct. 11, 2022

(54) TIRE TREAD COMPRISING UNDULATING GROOVES

(71) Applicant: COMPAGNIE GENERALE DES ETABLISSEMENTS MICHELIN, Clermont-Ferrand (FR)

(72) Inventors: Tony Zivkovic, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 96 days.

(21) Appl. No.: 16/954,166

(22) PCT Filed: Dec. 18, 2018

(86) PCT No.: PCT/FR2018/053361
§ 371 (c)(1),
(2) Date: Jun. 15, 2020

(87) PCT Pub. No.: WO2019/122677
PCT Pub. Date: Jun. 27, 2019

(65) Prior Publication Data
US 2021/0155051 A1 May 27, 2021

(30) Foreign Application Priority Data
Dec. 19, 2017 (FR) ...................................... 17/62475

(51) Int. Cl.
*B60C 11/03* (2006.01)

(52) U.S. Cl.
CPC ... *B60C 11/0323* (2013.01); *B60C 2011/0355* (2013.01); *B60C 2011/0381* (2013.01); *B60C 2200/06* (2013.01)

(58) Field of Classification Search
CPC ............... B60C 11/0323; B60C 11/032; B60C 2011/0369; B60C 2011/0381; B60C 11/042
See application file for complete search history.

(56) References Cited

U.S. PATENT DOCUMENTS

2013/0146191 A1* 6/2013 Audigier ............. B60C 11/0323
152/209.21

FOREIGN PATENT DOCUMENTS

FR 2 995 253 3/2014
WO WO 2011/039194 4/2011
(Continued)

*Primary Examiner* — Cedrick S Williams
(74) *Attorney, Agent, or Firm* — Cozen O'Connor

(57) ABSTRACT

A tread (1) for a heavy-duty vehicle tyre, having a tread surface (10) and an undulating groove (2) formed therein, having, when new, external cavities (21) open onto the tread surface (10) and internal cavities (22) entirely situated there-beneath when new, these cavities (22) connected to cavities (21) by linking cavities (23), each external cavity (21) intersecting the tread surface (10) along a corner edge contour delimiting an opening (210) having two end regions (A1, A2) and a surface area Se measured on the tread surface (10). In each end region (A1, A2) at least one thin blade (41, 42) of rubbery material is formed which is secured to at least one of the walls delimiting the undulating groove to reduce the surface area of the opening (210) of each external cavity (21) viewed from the tread surface (10) when new.

9 Claims, 2 Drawing Sheets

(56) References Cited

FOREIGN PATENT DOCUMENTS

| WO | WO 2017/174927 | 10/2017 |
| WO | WO 2017/176280 | 10/2017 |

\* cited by examiner

TIRE TREAD COMPRISING UNDULATING GROOVES

RELATED APPLICATIONS

This is a U.S. National Phase Application under 35 USC 371 of International Application PCT/FR2018/053361 filed on Dec. 18, 2018.

This application claims the priority of French application no. 17/62475 filed Dec. 19, 2017, the entire content of which is hereby incorporated by reference.

FIELD OF THE INVENTION

The invention relates to treads for tires and more particularly to the tread pattern designs of these treads, and to the tires provided with such treads which have a more lasting ability to drain away water on the road surface in wet weather, these treads also having improved wearing performance.

BACKGROUND OF THE INVENTION

As is known, the wet weather running conditions of a heavy-duty vehicle require rapid evacuation of the water present in the contact patch in which the tire makes contact with the road surface in order to ensure that the material making up the tread of the tire comes into contact with this road surface. The water which is not pushed ahead of and to the sides of the tire flows or is collected partially in the cuts or voids formed in the tread of the tire.

These cuts or voids form a fluid flow network which needs to be lasting, that is to say able to be effective throughout the service life of a tire between its new state and its removal on account of wear reaching a limit set by regulations.

For tires intended for the steering axles or load-bearing axles of a heavy-duty vehicle, it is common practice to form, in the tread of these tires, circumferential grooves (or longitudinal grooves), the depth of which is equal to the total thickness of the tread (this total thickness not taking into consideration the thickness that may be provided for allowing partial renewal of the grooves through an operation referred to as regrooving). Thus, it is possible to obtain a tread that has a water drainage performance which is always above a minimum performance referred to as the safe performance, this being true regardless of the level of wear of this tread.

For prior art tires, the total voids volume when new is, as a general rule, at least equal to 10% and at most equal to 25% of the total volume of the tread intended to be worn away during running (the total volume corresponding to the volume of material to which said total voids volume is added). These tires are found to have an available voids volume in the contact patch which is relatively high in the new state (available voids volume meaning that this volume is potentially able to be partially or completely filled with water present on the road surface). The voids volume opening onto the tread surface in the contact patch is evaluated when the tire is subjected to its usual inflation and load conditions as defined in particular by the E.T.R.T.O. standard for Europe.

While cuts or, more generally, cavities are essential to collecting and draining away water in the contact patch in contact with the road surface, the resulting reduction in the volume of material on the tread may appreciably affect the wearing performance of this tread and consequently may reduce the service life of the tire as a result of an increase in the rate of wear of said tread.

Among the cuts which may be moulded in a tread, a distinction is made between grooves and sipes, the latter, unlike grooves, having a width appropriate for the opposing walls that delimit them to come at least partially into contact with one another when entering the contact patch. The grooves bring about a lowering of the compression and shear stiffnesses because these grooves delimit portions of material that are sensitive to deformation compared with the portions delimited by sipes, the walls of which come to bear against one another when entering the contact patch. This decrease in stiffness, when grooves are present, causes an increase in deformation and brings about a decrease in the wearing performance of the tread. Greater wear is observed for a set distance covered and this corresponds to an increase in the rate of wear of the tread. Furthermore, an increase in rolling resistance and therefore in fuel consumption of vehicles equipped with such tires is observed as a result of an increase in the hysteresis losses associated with the cycles of deformation of the material of which the tread is made.

In order to limit the lowering in stiffness associated with the presence of grooves that is required as a result of the need to ensure the drainage of water, a solution described in the patent publication WO 2011/039194 has been proposed. According to this solution, forming a tread for a tire intended for a heavy-duty vehicle is proposed, this tread being provided with a plurality of grooves undulating in the thickness of the tread, each undulating groove opening discontinuously, with regular or irregular spacing, onto the tread surface when new. Each undulating groove has external cavities that are open onto the tread surface, these external cavities being separated from one another in the main direction of the undulating groove. The main direction of the undulating groove corresponds to the direction of the flow of water in the groove when running on ground covered in water. This undulating groove comprises, in addition to the external cavities, a plurality of internal cavities formed inside the tread, these internal cavities being placed radially and completely on the inside of the tread surface in the new state between the external cavities. The internal cavities may be designed to be situated at different depth levels in the thickness of the tread.

Moreover, the continuity of the flow of water, or more generally of fluid, in each undulating groove when the tire is in the new state, ensured by the presence of linking cavities or intermediate cavities, each linking cavity connecting an external cavity to an internal cavity. Each linking cavity has two ends, one of these ends being connected to an internal cavity and the other end being connected to an external cavity.

Sipes are provided to connect the internal cavities and the linking cavities to the tread surface when new in order to make it easier to mould and demould the tread.

By virtue of the presence of these linking cavities connecting the internal cavities and the external cavities, it is possible, when running on a road surface covered in water, to ensure circulation of the water from an external cavity to an internal cavity and thus to obtain better drainage of the water and better thermal ventilation of the tread. In addition, by virtue of this tread structure, a voids volume is obtained that is appropriate and decreased relative to that obtained with grooves that are completely open onto the tread surface. This type of undulating groove makes it possible to limit the reduction in stiffness of the tread in the new state.

However, it has been found that the presence of an undulating groove may generate running noise, and that this noise is caused in particular by the external cavities entering the contact patch and more particularly by the end regions of these external cavities entering the contact patch. Specifically, each external cavity comprises a corner edge contour having a geometry which is more or less elongate in the main direction of the groove and ending in end regions connected to the corner edges of the sipes surmounting the internal cavities and the linking cavities. These ends of the external cavities correspond to the regions of connection between the external cavity and a linking cavity. Since the noise performance is the subject of regulations in the field of tires for heavy-duty vehicles, it is important to limit as much as possible all the potential sources which generate running noise in the new state.

Definitions

Each external cavity comprises opposing walls, these walls being connected together by a bottom. The distance between the opposing walls defines a maximum width of the external cavity. The distance between the points of the bottom that are innermost in the tread and the tread surface when new defines a depth of the external cavity. Each external cavity has a mean length measured between the end regions of the corner edge contour when new in the main direction of the undulating groove.

The tread surface of a tread corresponds to all of the elementary surfaces of the tread that may come into contact with a road surface when a tire provided with such a tread is running.

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

The total thickness of a tread is measured in the new state, on the equatorial median plane of the tire provided with this tread, between the tread surface and the radially outermost part of the crown reinforcement.

A tread has a maximum thickness of material to be worn away during running, this maximum thickness of material to be worn away being, as a general rule, smaller than the total thickness of the tread.

The equatorial median plane is a plane perpendicular to the axis of rotation dividing the tire into two equal halves.

The usual running conditions of the tire or use conditions are those which are defined by the E.T.R.T.O. standard for running in Europe; these use conditions specify the reference inflation pressure corresponding to the load-bearing capacity of the tire as indicated by its load index and speed rating. These use conditions may also be referred to as "nominal conditions" or "working conditions".

SUMMARY OF THE INVENTION

In order to solve this problem of noise which may be found with a tread provided with at least one groove undulating in the thickness of the tread, an embodiment of the invention proposes a tread for a heavy-duty vehicle tyre, this tread comprising a tread surface intended to come into contact with a road surface during running and, opening onto this tread surface, at least one groove undulating in the thickness of the tread, that is to say a groove that, when new, opens discontinuously onto the tread surface when new, each undulating groove having, when new, external cavities that are open onto the tread surface and internal cavities that are entirely situated beneath the tread surface when new, these internal cavities being connected to the external cavities by linking cavities, each external cavity being delimited by lateral walls placed facing one another, these lateral walls meeting at a bottom of the external cavity, the innermost points of this bottom being situated at a distance Pce from the tread surface when new, each external cavity intersecting the tread surface when new along a corner edge contour having a maximum length Ls measured in the main direction of the undulating groove, this corner edge contour delimiting an opening having two end regions and having a total surface area Se measured on the tread surface when new, the bottom of each external cavity having a maximum length Lf.

This tread is such that, in each end region of each external cavity in the direction of the flow of fluid inside said groove, at least one thin blade of rubbery material is formed so as to reduce the open surface area of the opening of each external cavity viewed from the tread surface when new, each thin blade being secured to at least one of the lateral walls delimiting the undulating groove.

In the present description, a thin blade means a blade of rubbery material produced from the material of which the tread is made, this thin blade having a small but not necessarily constant thickness. A small thickness should be understood to mean a thickness appropriate for allowing the thin blade to bend towards the inside of the cavity during running on a road surface covered in water.

Advantageously, each thin blade has a thickness at most equal to 3 mm so as to allow bending under the action of a stream of liquid in the undulating groove. Even more preferentially, the thickness of each thin blade is at most equal to 2 mm.

By virtue of this arrangement, it is possible to modify the resonance noise generated by the circulation of air inside each undulating groove between the new state and partial wear, these blades of material coming to partially close the external cavities. By virtue of the flexibility of the thin blades, the circulation of the water is however not impeded too much during running on a road covered in water.

The thin blades may be secured to the walls of the external cavity or else to the walls delimiting the linking cavities.

Advantageously, the thin blades close at least 20% of the total surface area Se of each opening of the external cavities on the tread surface when new. These thin blades may close up to 100% of the total surface area, their flexibility consequently having to be determined in order to leave the possibility of a flow of water into the groove.

When a sipe is formed, when new, between each linking cavity and each internal cavity and the tread surface, this sipe promoting demoulding of the tread provided with internal cavities, it is advantageous for each thin blade to be split into two parts by a cut extending the sipe formed between the linking cavity and the tread surface when new.

When the length of the bottom Lf of the external cavities is smaller than the maximum length Ls of the opening of the external cavities, it is advisable for the length of each thin blade to be at least equal to half the difference between the maximum length Ls of the opening of the external cavities and the length of the bottom Lf in order to at least partially close the section of the linking cavities.

Advantageously, each thin blade has dimensions appropriate for allowing it to bend without touching the bottom of the external cavity in which it is formed.

An advantageous variant of the invention consists in radially offsetting the thin blades towards the inside of the tread so as to retain a certain level of effectiveness at least up to greater or lesser partial wear of the tread. Preferentially, this partial wear is chosen so as to be at most equal to 50% of the depth Pce of the external cavities.

Each thin blade may have a thickness that is variable so as to ensure greater flexibility of the thin blade while ensuring good mechanical integrity when new.

The invention also relates to a tire provided with a tread as described and even more particularly to a tire intended to be fitted to a heavy-duty vehicle.

As a variant embodiment of the invention, it is possible to realize configurations that are not necessarily symmetric: for example, in the case where the tire is designed to have a preferential direction of rotation indicated by a specific marking, the thin blades at the two ends of one and the same external cavity may be differentiated. The respective surface areas of the thin blades may be different between the end entering the contact patch first and that leaving the contact patch.

Further features and advantages of the invention will become apparent from the following description provided with reference to the appended drawings which show, by way of non-limiting examples, embodiments of the subject matter of the invention.

DETAILED DESCRIPTION OF THE FIGURES

FIG. 1 shows a view in cross section of a first variant of an undulating groove formed in a tread according to the invention;

FIG. 2 shows a surface view of the tread shown in FIG. 1;

FIG. 3 shows in cross section a second variant of an undulating groove according to the invention.

DESCRIPTION OF THE FIGURES

In order to make the figures easier to understand, identical reference signs have been used to describe variants of the invention where these reference signs refer to elements of the same kind, whether in terms of structure or of function.

Figure 1:
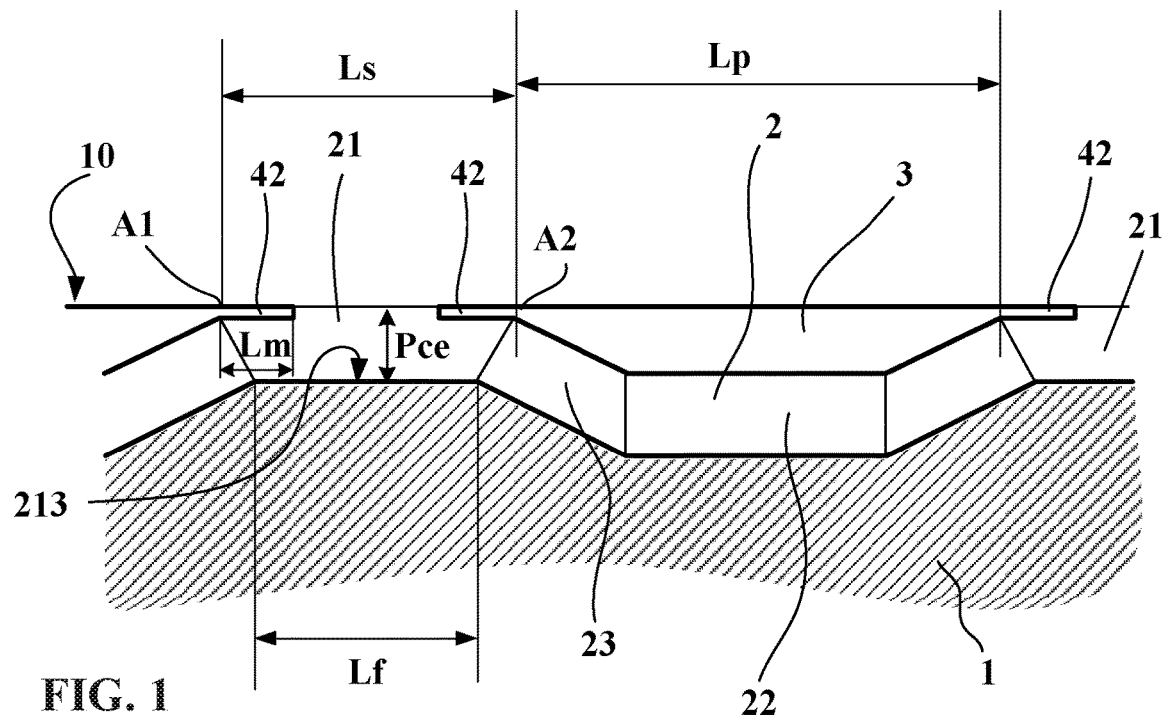
FIG. 1 shows, in cross section in a plane perpendicular to the axis of rotation of a tire of size 315/70R22.5, a part of a tread 1 comprising an undulating groove 2, this undulating groove 2 extending in the circumferential direction of the tire. In combination with this FIG. 1.

This undulating groove 2 comprises a plurality of external cavities 21 and a plurality of internal cavities 22, these external and internal cavities being disposed in alternation in the main direction of the undulating groove 2, that is to say in the direction of the flow of fluid inside said groove (in the case described, this direction corresponds to the circumferential direction).

Each external cavity 21 opens, when new, onto the tread surface 10 of the tread 1, this tread surface 10 corresponding to the surface of the tread that is intended to come into contact with the road surface during running.

Each internal cavity 22 is in the form of a channel moulded entirely beneath the tread surface 10 when new and is intended to open onto the tread surface after predetermined partial wear of the tread 1.

Linking cavities 23 are formed between the external cavities 21 and the internal cavities 22 so as to ensure continuity of flow in the undulating groove 2 when new, specifically up to partial wear of the tread corresponding substantially to the disappearance of the external cavities.

Moreover, a sipe 3 is formed between the tread surface 10 when new and the linking cavities 23 and the internal cavities 22, this sipe 3 being designed to close at least partially when entering the contact patch in contact with the road surface. This is not the case in the example shown here, but each corner edge formed on the tread surface by this sipe 3 may have, as is known, a chamfer which disappears after partial wear.

Each external cavity 21 is delimited by lateral walls 211, 212 that are disposed facing one another and distant from one another by an appropriate distance for there to be no contact between these lateral walls 211, 212 when entering the contact patch in contact with the road surface. These lateral walls 211, 212 are connected to one another by a bottom 213, the points of this bottom 213 that are innermost in the external cavity 21 being situated at a distance Pce from the tread surface 10 when new.

The corner edges formed by the lateral walls 211, 212 of the external cavity 21 on the tread surface 10 delimit an opening 210 of elongate form having two ends in the direction of the flow of fluid inside said groove, respectively denoted A1 and A2. At each of these ends a linking cavity 23 starts which is recessed into the tread so as to connect the external cavity 21 to internal cavities 22.

The opening 210 of each external cavity 21 has a maximum length Ls determined by the farthest-apart points on the tread surface when new and a maximum bottom length Lf measured on the bottom 213 of said external cavity. In the present example, the maximum length Ls of the opening 210 is greater than the length Lf of the bottom 213.

In this first described variant it is seen that two thin blades 41, 42 have been moulded at each end A1 and A2 of the opening 210 of each external cavity 21. These thin blades 41, 42 in this case have one and the same thickness equal to 2 mm and a maximum length Lm measured in the main direction of the external cavity 21 (direction connecting A1 to A2). This length Lm is in this case equal to 15 mm and is appropriate for partially covering the bottom 213 of the external cavity 21 and therefore covering the opening of the linking cavity 23. In this example, the length of the opening of the external cavities is equal to 55 mm, the depth Pce is equal to 6 mm, the length of the linking cavities equal to 10 mm and that of the internal cavities 55 mm.

In the present variant, each thin blade 41, 42 is secured to the lateral walls 211, 212 delimiting the external cavity 21 and is formed so as to be level with the tread surface 10 when new.

Figure 2:
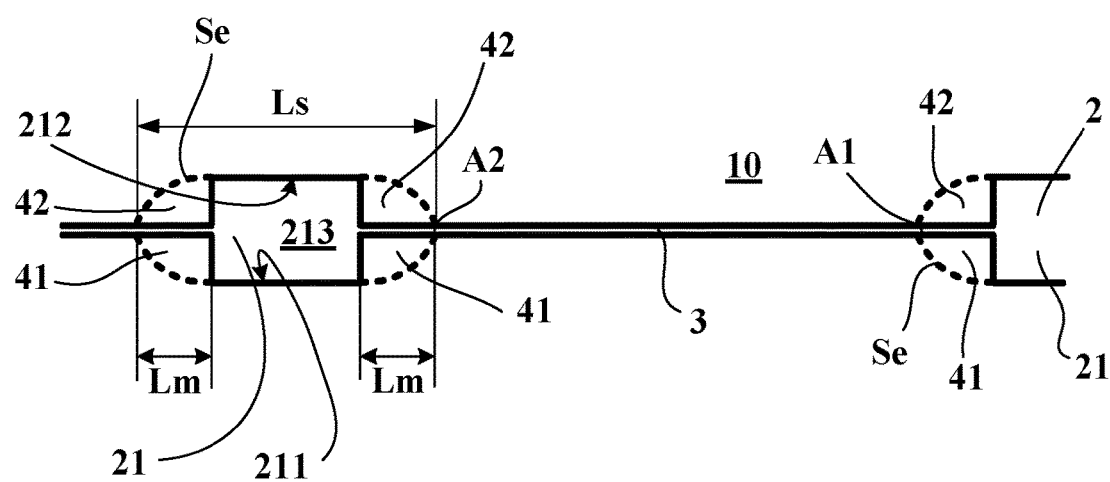
FIG. 2 shows a partial view of the tread surface 10 of the tread 1. The section plane of FIG. 1 corresponds to the plane of the longitudinal sipe 3.

FIG. 2, showing the same tread variant, makes it possible to see the tread surface 10 when new onto which there open external cavities 21 which are extended into the tread by linking cavities and internal cavities. The total surface area Se of the opening 210 which comprises both the substantially rectangular open part and the parts covered by the four thin blades 41, 42 is equally clearly visible in this FIG. 2. The contour of the surface Se follows the visible corner edges of the lateral walls 211 and 212 and the dotted lines correspond to the extension thereof (hidden by the thin blades) towards the ends A1, A2 of the external cavity.

The surface geometry of the thin blades 41, 42 formed at each end region A1, A2 of the external cavities 21 is also seen in this FIG. 2. This surface geometry is in this case substantially triangular and the set of the four thin blades which are formed on one and the same opening 210 covers a surface area equal in this case to 200 $mm^2$, i.e. approximately 36% of the total surface area Se of the opening 210 delimited by the corner edge contour of the external cavity 21 on the tread surface 10 when new as explained above.

By virtue of this arrangement, it is possible to reduce the contact noise resulting from the corner edge contour of each external cavity entering and leaving the contact patch in contact with a road surface during running when the tire is in the new state.

To ensure that this technical effect has a certain level of durability, it is advantageous to offset the thin blades partially or completely closing the openings of each external cavity on the tread surface towards the inside of the tread.

Figure 3:
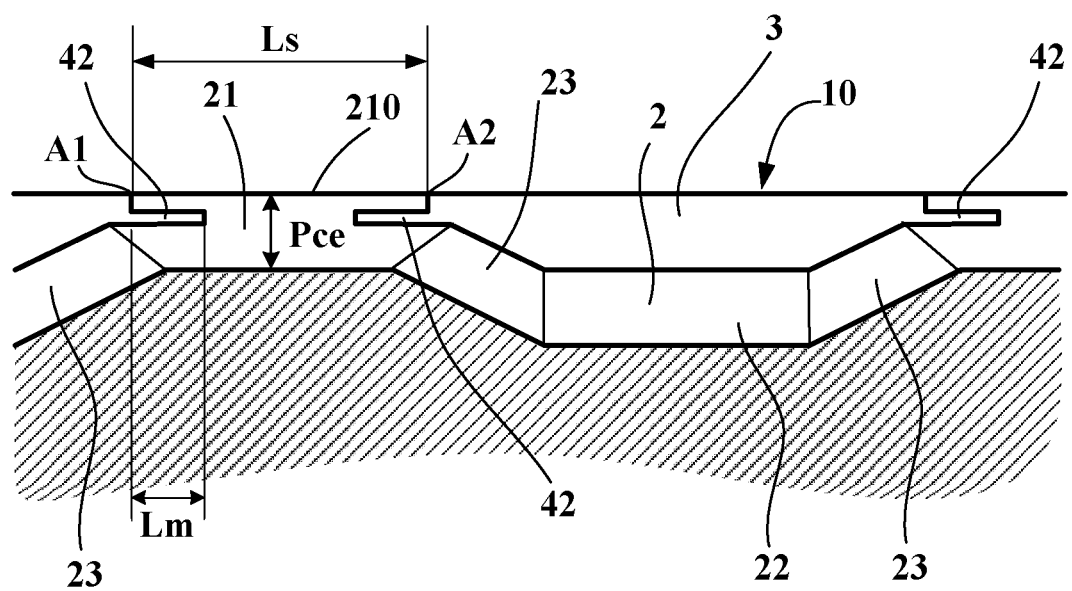

The second variant described with the aid of FIG. 3 shows the case of thin blades realized inside the tread at a non-zero distance from the tread surface when new.

In FIG. 3 a second variant of an undulating groove 2 according to the invention is seen, viewed in cross section. In this variant again using the elements of the first variant, namely the presence at each end of the opening of each external cavity 21 of two thin blades, each thin blade 42 is offset relative to the tread surface 10 when new by a distance corresponding substantially to one third of the depth Pce of the external cavity 21. In this FIG. 3 a single thin blade 42 is visible but there is actually another thin blade in combination with said thin blade 42 as shown in FIGS. 1 and 2.

To realize this offset, each thin blade 42 starts both on one of the walls delimiting the external cavity 21 and also on the wall delimiting the linking cavity 23. By virtue of its appropriate stiffness, each thin blade 41, 42 at least partially closes the opening 210 of each external cavity 21 which is favourable as regards the generation of noise during running on a dry road. Moreover, the suitable flexibility of each blade 41, 42 allows liquid to flow over the entire opening 210 of the external cavities 21 without excessively obstructing the linking cavities 23. In this example, the length Lm of the thin blades is adapted so that said thin blades are not constrained by possible contact thereof with the wall of the external cavity or of the linking cavity during bending under the effect of the circulation of a liquid in the groove 2.

In a variant not shown here, each thin blade may have a non-uniform thickness; in particular, it may be advisable for the thickness to be at a maximum at the points of connection to the walls. This variation in thickness may be combined with one or other of the variants described above. As has already been stated, the blades may be appropriate for substantially, i.e. completely or virtually completely, closing the opening of each cavity.

Of course, the invention is not limited to the examples described and depicted and various modifications may be made thereto without departing from the scope as defined by the claims.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a heavy-duty vehicle tire, this tread comprising a tread surface intended to come into contact with a road surface during running and, opening onto this tread surface, at least one groove undulating in the thickness of the tread, each undulating groove having, when new, external cavities that are open onto the tread surface and internal cavities that are entirely situated beneath the tread surface when new, these internal cavities being connected to the external cavities by linking cavities, each external cavity being delimited by lateral walls placed facing one another and meeting at a bottom, the innermost points of this bottom being situated at a distance Pce from the tread surface when new, each external cavity intersecting the tread surface along a corner edge contour having a maximum length Ls measured in the main direction of the undulating groove, this corner edge contour delimiting an opening of elongate form having first and second end regions and having a total surface area Se measured on the tread surface, the bottom of each external cavity having a maximum length Lf, wherein in each of the first and second end regions in the direction of the flow of fluid inside said groove of each external cavity, a pair of thin blades of rubbery material are formed, so as to form:

a first opposing pair of thin blades, each having a shape of a disc portion, arranged at the first end region, each blade of the first opposing pair being secured to an opposing one of the lateral walls and directly opposite the other blade of the first opposing pair, and a second opposing pair of thin blades, each having a shape of a disc portion, arranged at the second end region, each blade of the second opposing pair being secured to an opposing one of the lateral walls and directly opposite the other blade of the second opposing pair, the first and second opposing pairs of thin blades being configured to delimit the undulating groove so as to reduce an open surface area of the opening of each external cavity viewed from the tread surface when new.

2. The tire tread according to claim 1, wherein each thin blade has a thickness at most equal to 3 mm.

3. The tire tread according to claim 1, wherein the thin blades cover at least 20% of the total surface area Se of each opening of the external cavities on the tread surface when new.

4. The tire tread according to claim 1, wherein, when the length of the bottom Lf of the external cavities is smaller than the maximum length Ls of the opening of the external cavities, the length of each thin blade is at least equal to half the difference between the maximum length Ls of the opening of the external cavities and the length of the bottom Lf.

5. The tire tread according to claim 1, wherein the undulating groove is a longitudinal groove.

6. The tire tread according to claim 1, wherein the thin blades are radially offset towards the inside of the tread so as to retain a certain level of effectiveness at least up to partial wear of the tread, this partial wear being chosen so as to be at most equal to 50% of the depth Pce of the external cavities.

7. The tire tread according to claim 6, wherein each thin blade has a variable thickness so as to ensure greater flexibility of the thin blade while ensuring good mechanical integrity when new.

8. The tire comprising a tread according to claim 1, wherein the tire is configured for fitting to a heavy-duty vehicle.

9. The tire according to claim 8, wherein the tire is configured to have a preferential direction of rotation and wherein the thin blades at the two ends (A1, A2) of each opening are geometrically different, with respect to their respective surface areas for covering said opening.

* * * * *